United States Patent
Kobayashi et al.

(10) Patent No.: US 9,859,534 B2
(45) Date of Patent: Jan. 2, 2018

(54) SECONDARY BATTERY

(71) Applicant: TOYOTA JIDOSHA KABUSHIKI KAISHA, Toyota-shi, Aichi-ken (JP)

(72) Inventors: Keiichiro Kobayashi, Nisshin (JP); Koshiro Yoneda, Kasugai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 58 days.

(21) Appl. No.: 15/152,910

(22) Filed: May 12, 2016

(65) Prior Publication Data
US 2016/0336548 A1 Nov. 17, 2016

(30) Foreign Application Priority Data
May 15, 2015 (JP) ................................. 2015-100035

(51) Int. Cl.
*H01M 2/02* (2006.01)
*H01M 10/04* (2006.01)
*H01M 10/0587* (2010.01)
*H01M 10/0525* (2010.01)

(52) U.S. Cl.
CPC ......... *H01M 2/0257* (2013.01); *H01M 2/028* (2013.01); *H01M 10/0431* (2013.01); *H01M 10/0587* (2013.01); *H01M 10/0525* (2013.01); *H01M 2002/0297* (2013.01)

(58) Field of Classification Search
CPC ............... H01M 2/0257; H01M 2/028; H01M 2002/0297; H01M 10/0525; H01M 10/0587; H01M 10/0431
See application file for complete search history.

(56) References Cited

U.S. PATENT DOCUMENTS

2013/0216892 A1    8/2013    Matsuura et al.

FOREIGN PATENT DOCUMENTS

| JP | 2004-253330 A | 9/2004 |
|---|---|---|
| JP | 2013-222504 A | 10/2013 |
| WO | 2012/056846 A1 | 5/2012 |

*Primary Examiner* — Brittany Raymond
(74) *Attorney, Agent, or Firm* — Sughrue Mion, PLLC (57) ABSTRACT

A thermal expansion coefficient of a battery case may be lower than those of an insulating film and a separator. Portions of the insulating film, which are held in contact with the electrode body and the battery case, may be adhered to the separator, which is positioned on the outermost surface of the electrode body, and the battery case, respectively. A first 90 degree peeling strength of an adhesion portion between the insulating film and the battery case is higher than a second 90 degree peeling strength of an adhesion portion between the insulating film and the separator. The first 90 degree peeling strength may be 15 mN/cm or higher, and the second 90 degree peeling strength may be 5 mN/cm or higher.

18 Claims, 4 Drawing Sheets

SECONDARY BATTERY

CROSS REFERENCE TO RELATED APPLICATIONS

The disclosure of Japanese Patent Application No. 2015-100035 filed on May 15, 2015 including the specification, drawings and abstract is incorporated herein by reference in its entirety.

BACKGROUND

1. Field

The present disclosure relates to a secondary battery and method of manufacturing the same.

2. Description of Related Art

Some secondary batteries, for example, a nonaqueous electrolyte secondary battery such as a lithium ion secondary battery, may have a lighter weight and a higher energy density than other various existing batteries. As a result, nonaqueous electrolyte secondary batteries have been used as a so-called "portable power supply" for a PC, a portable device, or the like or as a power supply for a vehicle. It is expected that light-weight lithium ion secondary batteries capable of obtaining a high energy density will be increasingly used as a high-output power supplies for driving a vehicle such as an electric vehicle (EV), a hybrid vehicle (HV), or a plug-in hybrid vehicle (PHV).

Some secondary batteries have a structure in which a wound electrode body is accommodated within a battery case. The wound electrode body may be obtained by laminating and winding an elongated positive electrode sheet, an elongated negative electrode sheet, and an elongated separator to obtain a wound laminate. A metal case may be used as a battery case. In the wound electrode body, current collector portions are provided at both end portions in a width direction (a direction perpendicular to a longitudinal direction). In the current collector portions, a positive electrode and a negative electrode may be exposed. Therefore, when a battery case is formed of metal, for example, as described in Japanese Patent Application Publication No. 2013-222504 (JP 2013-222504 A), an electrode body is covered with a rectangular-cuboid shaped insulating film to insulate the battery case and the electrode body from each other. In order to prevent the electrode body from moving into the battery case due to vibration of a vehicle, the insulating film may be fixed to the battery case by thermal welding.

SUMMARY

In order to improve the volumetric efficiency of a secondary battery, a reduction in the thickness of an insulating film was studied. As a result of the study, it was found that, when a secondary battery repeatedly undergoes a temperature change between a high temperature (for example, 60° C. or higher) and a low temperature (for example, −30° C. or lower), there may be a problem in that an insulating film is likely to be broken. When an insulating film is broken, an electrode body and a battery case may not be insulated from one another.

The present disclosure provides a secondary battery including an insulating film that is provided between an electrode body and a battery case, in which the breakage of the insulating film can be prevented even when a temperature change between a high temperature and a low temperature is repeated.

According to an aspect of the present disclosure, there is provided a secondary battery including: an electrode body including a positive electrode, a negative electrode, and a separator which is positioned on an outermost surface of the electrode body; a battery case that accommodates the electrode body; and an insulating film that may be held in contact with the electrode body and the battery case. A thermal expansion coefficient of the battery case may be lower than those of the insulating film and the separator. Portions of the insulating film, which are held in contact with the electrode body and the battery case, may be adhered to the separator, which is positioned on the outermost surface of the electrode body, and the battery case. A first portion of the insulating film may be adhered to the battery case with a first 90 degree peeling strength (hereinafter, also referred to as "peeling strength A"). A second portion of the insulating film may be adhered to the separator with a second 90 degree peeling strength (hereinafter, also referred to as "peeling strength B"). The first 90 degree peeling strength may be 15 mN/cm or higher, and the second 90 degree peeling strength may be 5 mN/cm or higher. With the above-described configuration, a secondary battery can be provided in which, even when a temperature change between a high temperature (for example, 60° C. or higher) and a low temperature (for example, −30° C. or lower) is repeated, the breakage of the insulating film can be prevented.

In accordance with the above-described aspect of the present disclosure, at least one surface of the insulating film may be hydrophilized, and the hydrophilized surface may face an inner wall of the battery case.

In accordance with the above-described aspect of the present disclosure, a thickness of the insulating film may be 70 μm or less. Additionally or alternatively, the thickness of the insulating film may be 30 μm or more. For example, the thickness of the insulating film may be between 45 μm and 55 μm. An insulating film having a thickness in the above-described range may be advantageous from the viewpoint of the volumetric efficiency of the battery. However, when a temperature change between a high temperature and a low temperature is repeated, an insulating film having a thickness in the above-described range may be broken. As a result, the effect of preventing breakage of the insulating film is particularly significant.

In accordance with the above-described aspect of the present disclosure, the first 90 degree peeling strength may be between 25 mN/cm and 50 mN/cm, and the second 90 degree peeling strength may be between 5 mN/cm and 30 mN/cm.

In accordance with the above-described aspect of the present disclosure, the battery case may be formed of aluminum or an aluminum alloy.

In accordance with the above-described aspect of the present disclosure, the separator may be formed of polyolefin.

In accordance with the above-described aspect of the present disclosure, the insulating film may be formed of polyolefin.

According to an aspect of the present disclosure, there is provided a secondary battery including: an electrode body, an insulating film, and a battery case which accommodates the electrode body. The insulating film may be held in contact with the battery case and the electrode body. An outer surface of the insulating film may be adhered to an inner surface of the battery case with a first adhesion strength. An inner surface of the insulating film may be adhered to an outer surface of the electrode body with a second adhesion strength. The first adhesion strength may be greater than the second adhesion strength.

In accordance with the above-described aspect of the present disclosure, the first adhesion strength may be a 90 degree peeling strength of 15 mN/cm or higher, and the second adhesion strength may be a 90 degree peeling strength of 5 mN/cm or higher.

In accordance with the above-described aspect of the present disclosure, the first adhesion strength may be a 90 degree peeling strength of between 25 mN/cm and 50 mN/cm, and the second adhesion strength may be a 90 degree peeling strength of between 5 mN/cm and 30 mN/cm.

In accordance with the above-described aspect of the present disclosure, a ratio of the first adhesion strength to the second adhesion strength may be 3:1 or greater.

In accordance with the above-described aspect of the present disclosure, the outer surface of the insulating film may be hydrophilized.

In accordance with the above-described aspect of the present disclosure, a thickness of the insulating film may be between 45 µm and 55 µm.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, exemplary embodiments of the present disclosure will be described with reference to the drawings. Matters not specifically described herein which relate to the practice of the exemplary embodiments described herein may be understood as mere design matters for a person of ordinary skill in the art. It should be appreciated that the exemplary embodiments described herein may be practiced based on the contents of the present disclosure alone or in combination with knowledge or skill common to a person of ordinary skill in the art. Parts or portions described herein which have the same function are generally represented by the same reference characters. It should be appreciated that any dimensional relationships (for example, length, width, or thickness) shown in the drawings or described herein may not reflect an actual dimensional relationship.

The exemplary secondary batteries described herein may generally relate to storage devices which may be repeatedly charged and discharged. For example, the exemplary secondary batteries described herein may comprise so-called "storage batteries" such as lithium ion secondary batteries and electric double layer capacitors. Hereinafter, an exemplary embodiment of the present disclosure will be described in detail with reference to a flat square lithium ion secondary battery. It should be appreciated, however, that the present disclosure is not intended to be limited to this exemplary embodiment.

Figure 1:
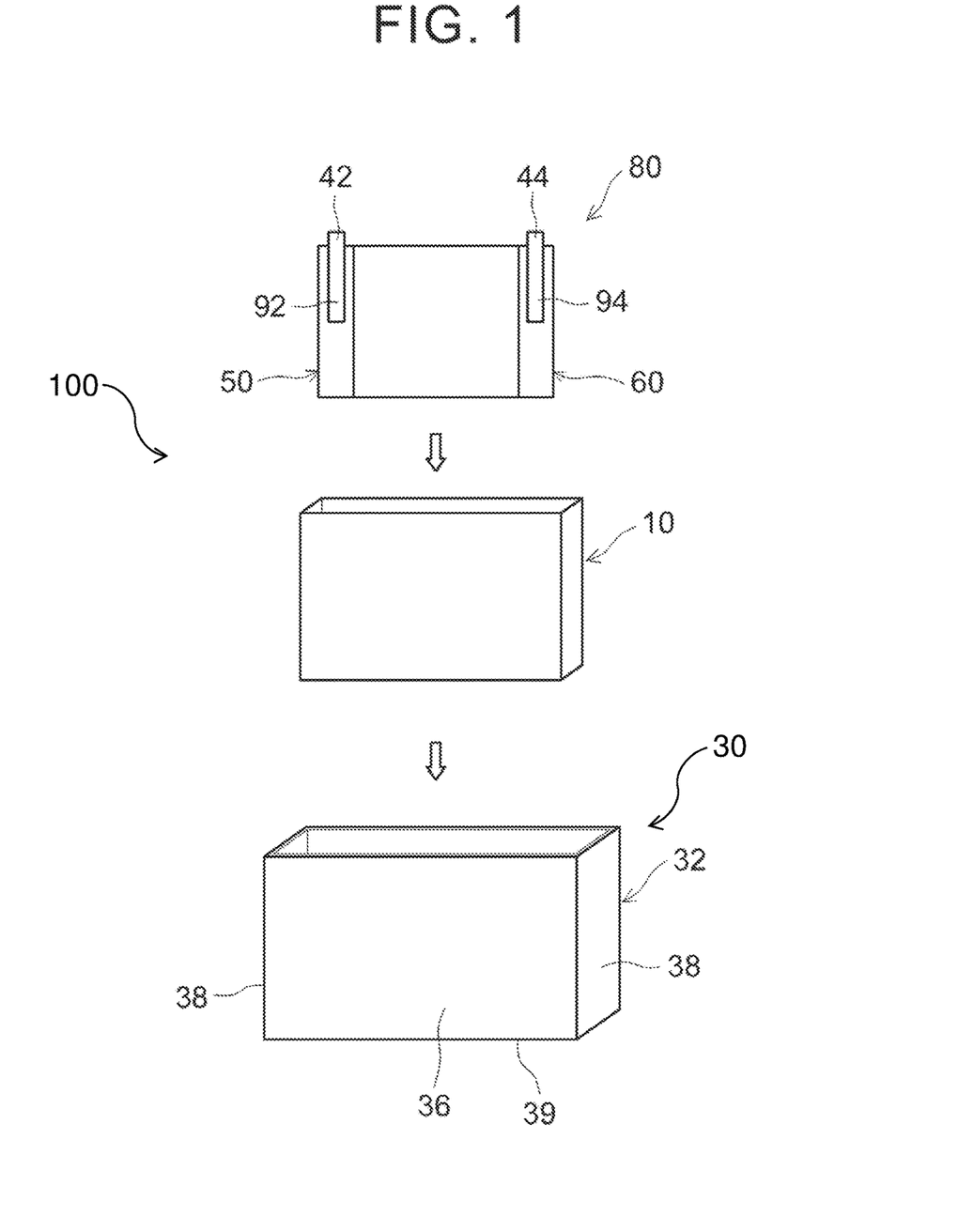
FIG. 1 is an exploded perspective view schematically showing a configuration of a secondary battery according to an embodiment.
Figure 2:
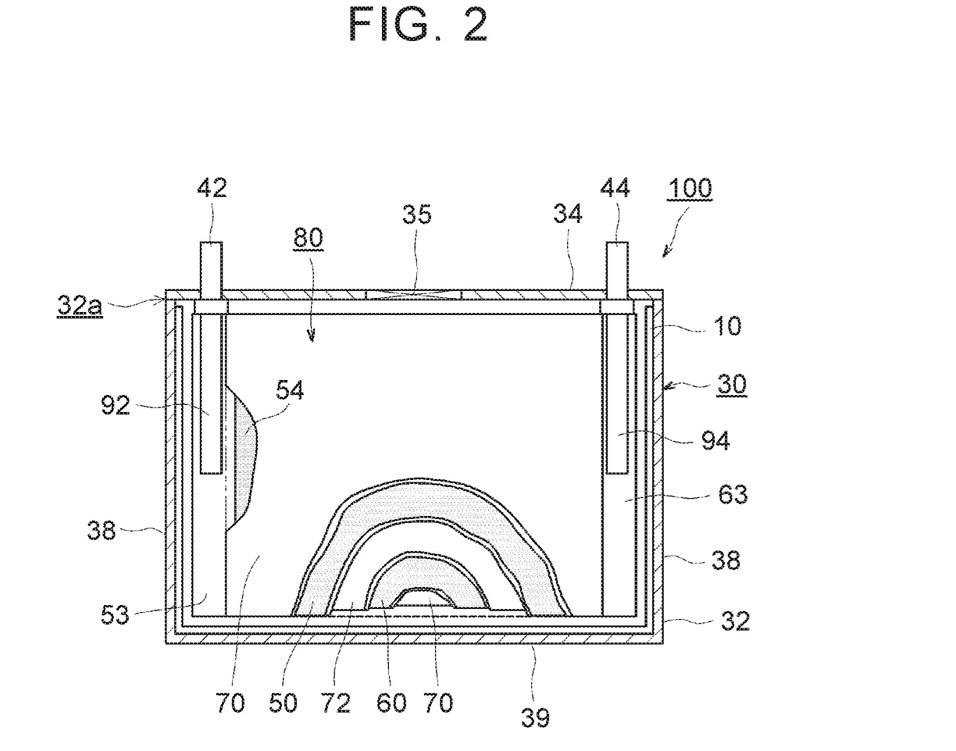
FIG. 2 is a cross-sectional view schematically showing the configuration of the secondary battery of FIG. 1.

FIG. 1 is an exploded perspective view schematically showing a configuration of a lithium ion secondary battery 100 according to the present exemplary embodiment. FIG. 2 is a cross-sectional view schematically showing a configuration (in particular, an internal configuration) of the lithium ion secondary battery 100 according to the present exemplary embodiment. As shown in FIGS. 1 and 2, the lithium ion secondary battery 100 includes an electrode body 80, a battery case 30, and an insulating film 10.

[Electrode Body]

Figure 3:
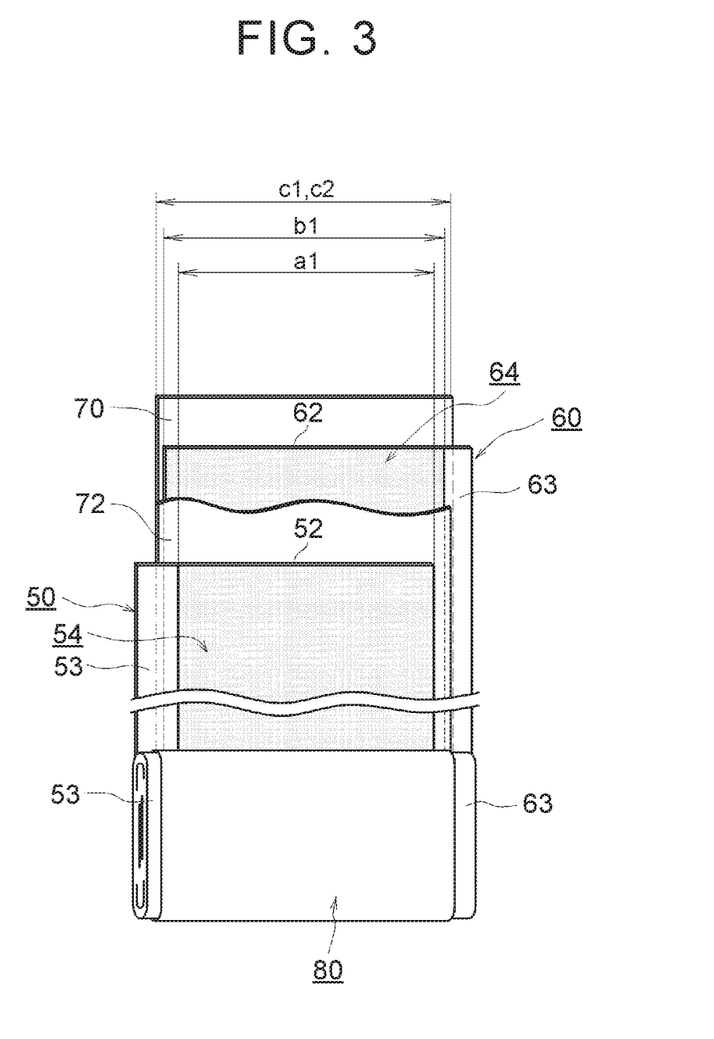
FIG. 3 is a perspective view schematically showing a wound electrode body of the secondary battery of FIG. 1.

As shown in FIGS. 2 and 3, the electrode body 80 according to the present exemplary embodiment is a wound electrode body. The electrode body 80 may be obtained by first laminating a positive electrode (positive electrode sheet) 50, a negative electrode (negative electrode sheet) 60, and two separators 70, 72 to obtain a laminate. The laminate may then be wound to obtain a wound electrode body. The wound electrode body may then be compressed into a generally flat shape to obtain the electrode body 80. In the present exemplary embodiment, the separator 70 is positioned on an outermost surface of the electrode body 80. The outermost surface refers to a surface which is exposed on the outermost side. It should be appreciated, however, that the electrode body 80 is not limited to a wound electrode body and may instead be a laminate electrode body for example. In those exemplary embodiments in which the electrode body 80 is a laminate electrode body, the separator 70 may be positioned on the outermost surface of the electrode body 80.

As shown in FIG. 3, the positive electrode sheet 50 includes an elongated positive electrode current collector (positive electrode core) 52. The positive electrode sheet 50 further includes a positive electrode active material layer non-forming portion (non-coated portion) 53 and a positive electrode active material layer 54. The positive electrode active material layer non-forming portion 53 is provided along a lengthwise edge of the positive electrode current collector 52. In the present exemplary embodiment, the positive electrode active material layer 54 is formed on both surfaces of the positive electrode current collector 52. It should be appreciated, however, that in some exemplary embodiments, the positive electrode active material layer 54 may be formed on only one surface of the positive electrode current collector 52.

The positive electrode active material layer 54 contains a positive electrode active material. The positive electrode active material layer 54 may be joined to the positive electrode current collector 52 in a state where particles of the positive electrode active material and a conductive material bind to each other through a binder. The positive electrode sheet 50 may be manufactured using a method including: dispersing the positive electrode active material, the conductive material, and the binder in an appropriate solvent to prepare a positive electrode paste (for example, a slurry, an ink, and the like); supplying the positive electrode paste to the surface of the positive electrode current collector 52 other than the positive electrode active material layer non-forming portion 53; and drying the positive electrode paste to remove the solvent therefrom. A conductive member formed of highly conductive metal (for example, aluminum, nickel, titanium, or stainless steel) may be used as the positive electrode current collector 52. In the present exemplary embodiment, the positive electrode current collector 52 is described as an aluminum foil.

Among other examples, a lithium-containing compound (for example, lithium transition metal composite oxide) containing lithium and one or more kinds or types of transition metal elements may be used as the positive electrode active material. The lithium-containing compound may be a material capable of storing and releasing lithium ions. Some examples of lithium-containing compounds include a ternary lithium-containing composite oxide such as lithium nickel cobalt manganese composite oxide (for example, $LiNi_{1/3}Co_{1/3}Mn_{1/3}O_2$) and a polyanionic compound (for example, $LiFePO_4$ or $LiMnPO_4$).

Among other examples, the conductive material may comprise any of the various conductive materials used in lithium ion secondary batteries of the related art. For example, the conductive material may include a carbon material such as carbon powder or carbon fiber. Among other examples, various carbon blacks and graphite powders may be used as the carbon powder. Among the various conductive materials, one or more kinds or types may be used alone or in combination with one another.

Among other examples, the binder may comprise any of the various binders used in positive electrodes of lithium ion secondary batteries of the related art. For example, when the positive electrode active material layer 54 is formed by supplying a positive electrode paste, a polymer which can be uniformly dissolved or dispersed in a solvent constituting the positive electrode paste may be used as the binder. Among other examples, the binder may include polyvinylidene fluoride (PVDF).

Among other examples, the solvent for dissolving the constituent materials of the above-described positive electrode active material layer 54, may comprise an aqueous solvent or a nonaqueous solvent (organic solvent) having properties corresponding to the properties of the binder used.

As shown in FIG. 3, the negative electrode sheet 60 includes an elongated negative electrode current collector (negative electrode core) 62. The negative electrode sheet 60 further includes a negative electrode active material layer non-forming portion (non-coated portion) 63 and a negative electrode active material layer 64. The negative electrode active material layer non-forming portion 63 is provided along one edge of the negative electrode current collector 62 in the width direction. In the present exemplary embodiment, the negative electrode active material layer 64 is formed on both surfaces of the negative electrode current collector 62. It should be appreciated, however, that in some exemplary embodiments, the negative electrode active material layer 64 may be formed on only one surface of the negative electrode current collector 62.

The negative electrode active material layer 64 contains a negative electrode active material. The negative electrode active material layer 64 may be joined to the negative electrode current collector 62 in a state where particles of the negative electrode active material bind to each other through a binder. The negative electrode sheet 60 may be manufactured, for example, by dispersing the negative electrode active material and the binder in an appropriate solvent (for example, water or N-methyl-2-pyrrolidone) to prepare a negative electrode paste; supplying the negative electrode paste to the surface of the negative electrode current collector 62 other than the negative electrode active material layer non-forming portion 63; and then drying the negative electrode paste to remove the solvent therefrom. A conductive member formed of highly conductive metal (for example, copper, nickel, titanium, or stainless steel) may be used as the negative electrode current collector 62. In the present exemplary embodiment, the negative electrode current collector 62 is described as a copper foil.

Among other examples, one kind or a combination (a mixture or a complex) of two or more kinds of various materials which can be used as a negative electrode active material for a lithium ion secondary battery may be used as the negative electrode active material. For example, various carbon materials such as graphite, non-graphitizable carbon (hard carbon), and graphitizable carbon (soft carbon) may be used as the negative electrode active material. Amorphous carbon may be arranged on at least a portion of a surface of the graphite-based material. Lithium titanium composite oxide such as $LI_4Ti_5O_{12}$ or lithium transition metal composite oxide such as lithium transition metal composite nitride may also be used as the negative electrode active material.

Among other examples, the binder may comprise any of the various binders used in negative electrodes of lithium ion secondary batteries of the related art. For example, styrene-butadiene rubber (SBR) may be used as the binder.

Depending on the method of forming the negative electrode active material layer 64, a thickener may be added. Among other examples, the binders described above may be used as the thickener. For example, the following water-soluble or water-dispersible polymers may be used as the binder: cellulose polymers such as methyl cellulose (MC), carboxymethyl cellulose (CMC), and cellulose acetate phthalate (CAP); and polyvinyl alcohol (PVA).

The separators 70, 72 are members which separate the positive electrode sheet 50 and the negative electrode sheet 60 from each other. The separators 70, 72 are configured to hold the nonaqueous electrolyte. The separators 70, 72 are further configured to perform a shutdown function. Among other examples, a porous film formed of a resin such as polyethylene (PE), polypropylene (PP), polyester, cellulose, or polyamide may be used as the separators 70, 72. In some exemplary embodiments, a porous film formed of a polyolefin resin such as PE or PP may be used. The separators 70, 72 may have a single-layer structure of one porous film or a multi-layer structure of two or more porous films. The multi-layer structure may be formed of two or more layers of the same material laminated together. Alternatively, the multi-layer structure may be formed of two or more layers of different materials having different properties (for example, average thickness or porosity) laminated together. For example, the multi-layer structure may be a three-layer structure in which a PP layer is laminated on both surfaces of a PE layer. A heat resistance layer (HRL) may be provided on surfaces of the separators 70, 72 on the negative electrode side.

The electrode body 80 may be prepared using a method including: laminating the positive electrode sheet 50 and the negative electrode sheet 60 with the separators 70, 72 between the positive electrode active material layer 54 and the negative electrode active material layer 64 to obtain a laminate; winding the laminate to obtain a wound body; and compressing the wound body into a generally flat shape to obtain the electrode body 80.

As shown in FIG. 3, a width b1 of the negative electrode active material layer 64 is wider than a width a1 of the positive electrode active material layer 54. Further, widths c1, c2 of the separators 70, 72 are wider than the width b1 of the negative electrode active material layer 64 such that the following relationship is realized: c1, c2>b1>a1. The positive electrode sheet 50, the negative electrode sheet 60, and the separators 70, 72 are aligned in the longitudinal direction so as to overlap each other in the following order: the positive electrode sheet 50, the separator 72, the negative electrode sheet 60, and the separator 70. The positive electrode active material layer non-forming portion (non-coated portion) 53 of the positive electrode sheet 50 and the negative electrode active material layer non-forming portion (non-coated portion) 63 of the negative electrode sheet 60 protrude from opposite sides in the widthwise direction of the separators 70, 72. The laminated sheet materials are wound around a winding axis set in the widthwise direction.

[Insulating Film]

The insulating film 10 is arranged between the electrode body 80 and the battery case 30 so as to separate the electrode body 80 and the battery case 30 from each other. As a result, direct contact between the electrode body 80, which is a power generating element, and the battery case 30 can be avoided, and insulation between the electrode body 80 and the battery case 30 can be maintained. In the present exemplary embodiment, the insulating film 10 has a rectangular-cuboid shape. The insulating film 10 includes an internal space and an opening formed in an upper surface thereof which provides access to the internal space of the insulating film 10. The electrode body 80 may be accommodated within the insulating film 10 via the opening. It should be appreciated that the shape of the insulating film 10 is not limited to a rectangular-cuboid shape. For example, among other shapes, the insulating film 10 may have a cylindrical shape, a planar shape, or a bag shape with an open end for receiving contents therein, i.e., the electrode body 80. The insulating film 10 may comprise any appropriate insulating material. For example, a resin material such as polyolefin (for example, polypropylene (PP) or polyethylene (PE)) may be used as the insulating film 10.

The insulating film 10 may have any appropriate thickness. For example, in some exemplary embodiments, the thickness of the insulating film 10 may be relatively small from the viewpoint of the volumetric efficiency of the battery. In particular, the thickness of the insulating film 10 may be 70 µm or less in some exemplary embodiments. In other exemplary embodiments, the thickness of the insulating film 10 may be 60 µm or less. In still other exemplary embodiments, the thickness of the insulating film 10 may be 58 µm or less or even 55 µm or less. On the other hand, from the viewpoint of film strength, the thickness of the insulating film 10 may be 30 µm or more in some exemplary embodiments. In other exemplary embodiments, the thickness of the insulating film 10 may be 40 µm or more. In still other exemplary embodiments, the thickness of the insulating film 10 may be 42 µm or more or even 45 µm or more. In particular, in those exemplary embodiments where the thickness of the insulating film 10 is 70 µm or less, when a temperature change between a high temperature and a low temperature is repeated, the insulating film 10 may be broken. However, in those exemplary embodiments where the thickness of the insulating film 10 is within the above-described range, when a temperature change between a high temperature and a low temperature is repeated, breakage of the insulating film 10 may be prevented. In the present exemplary embodiment, the insulating film 10 is described as having a thickness of 50 µm.

[Battery Case]

As shown in FIG. 2, the battery case 30 according to the present exemplary embodiment is a so-called "square" (typically, a rectangular-cuboid shape) battery case having eight corner portions in total. The battery case 30 is formed such that an internal space thereof has a box shape generally corresponding to a shape of the electrode body 80. The battery case 30 includes a case body 32 and a lid 34. The case body 32 includes an internal space and an opening formed in an upper surface thereof which provides access to the internal space of the case body 32. The lid 34 may be positioned over the opening of the case body 32 to cover the opening. The case body 32 may accommodate the electrode body 80 and the insulating film 10 through the opening. As best seen in FIG. 1, the case body 32 includes: a pair of wide sides 36, inner surfaces of which face a flat surface of the electrode body 80 with the electrode body 80 accommodated within the case body 32; a pair of narrow sides 38 which extend between the wide sides 36; and a bottom 39.

A material having a lower thermal expansion coefficient than the insulating film 10 and the separators 70, 72 may be used as the material of the battery case 30. For example, the battery case 30 may comprise a metal material such as aluminum, stainless steel, or nickel-plated steel; or a resin material such as a polyphenylene sulfide resin or a polyimide resin. In the present exemplary embodiment, the battery case 30 (specifically, the case body 32 and the lid 34) is described as being formed of aluminum or an aluminum alloy.

[Overall Configuration of Battery]

In the present exemplary embodiment, the lithium ion secondary battery 100 may be configured to have a size suitable for use within a vehicle. As shown in FIGS. 1 and 2, the battery case 30 has a rectangular-cuboid shaped internal space which accommodates the electrode body 80. The rectangular-cuboid internal space of the battery case 30 has a slightly larger width than the electrode body 80. The electrode body 80 is accommodated within the rectangular-cuboid internal space of the battery case 30 in a state of being compressed into a generally flat shape in a direction perpendicular to the winding axis. The insulating film 10 is arranged between the case body 32 and the electrode body 80 such that the case body 32 and the electrode body 80 are insulated from each other. A positive electrode terminal 42 and a negative electrode terminal 44 are attached to the lid 34 of the battery case 30. The positive electrode terminal 42 and the negative electrode terminal 44 extend through the battery case 30, i.e., extend through lid 34, and protrude from the battery case 30 to the outside. In addition, a safety valve 35 is provided on the lid 34. An injection hole through which an electrolytic solution is injected during battery manufacturing is provided adjacent to the safety valve 35. A joint 32a between the lid 34 and the case body 32 is sealed by laser welding, for example.

In the electrode body 80, the positive electrode active material layer non-forming portion (non-coated portion) 53 of the positive electrode sheet 50 and the negative electrode active material layer non-forming portion (non-coated portion) 63 of the negative electrode sheet 60 protrude from opposite sides in the widthwise direction of the separators 70, 72. A positive electrode current collector terminal 92 is provided in the positive electrode active material layer non-forming portion 53 and is connected to the positive electrode terminal 42. The positive electrode current collector terminal 92 may be formed of aluminum or an aluminum alloy, for example. The positive electrode current collector terminal 92 extends to the center of the positive electrode active material layer non-forming portion 53 of the electrode body 80. A tip end portion of the positive electrode current collector terminal 92 may be welded (for example, by ultrasonic welding) to the center of the positive electrode active material layer non-forming portion 53. A negative electrode current collector terminal 94 is provided in the negative electrode active material layer non-forming portion 63 and is connected to the negative electrode terminal 44. The negative electrode current collector terminal 94 may be formed of copper or a copper alloy, for example. The negative electrode current collector terminal 94 extends to the center of the negative electrode active material layer non-forming portion 63 of the electrode body 80. A tip end portion of the negative electrode current collector terminal 94 may be welded (for example, by resistance welding) to the center of the negative electrode active material layer non-forming portion 63.

An electrolytic solution (not shown) is sealed within the battery case 30. Among other examples, the electrolytic solution may comprise a nonaqueous electrolytic solution. The nonaqueous electrolytic solution may comprise: a nonaqueous solvent; and a lithium salt (supporting electrolyte) which is soluble in the solvent. Aprotic solvents such as carbonates, esters, ethers, nitriles, sulfones, and lactones may be used as the nonaqueous solvent. For example, one or more of various kinds well-known nonaqueous solvents, which may be generally used as an electrolytic solution for lithium ion secondary batteries, may be used. Examples of such well-known nonaqueous solvents include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, and γ-butyrolactone.

Among other examples, the supporting electrolyte may comprise one or more kinds of various lithium salts. Such lithium salts may be used as a supporting electrolyte in an electrolytic solution for lithium ion secondary batteries. Some examples of lithium salts include $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$. Any concentration of the supporting electrolyte may be used. For example, the concentration of the supporting electrolyte may be similar to concentrations used in various electrolytic solutions which are used for lithium ion secondary batteries of the related art. In some exemplary embodiments, the concentration of the supporting electrolyte in the nonaqueous electrolytic solution is about 0.1 mol/L to 5 mol/L (for example, about 0.8 mol/L to 1.5 mol/L).

From the viewpoint of further improving the characteristics of the lithium ion secondary battery 100, the nonaqueous electrolytic solution may further contain additives such as a film forming agent, an overcharge additive, a surfactant, a dispersant, or a thickener.

In the present exemplary embodiment, portions of the insulating film 10, which are held in contact with the electrode body 80 and the battery case 30, may be adhered to the separator 70, which is positioned on the outermost surface of the electrode body 80, and the battery case 30, respectively. In those portions of the insulating film 10 which are held in contact with the electrode body 80 and the battery case 30, the insulating film 10 may be held in surface contact with the electrode body 80 and the battery case 30 while receiving pressure therefrom. In JP 2013-222504 A, an insulating film is disclosed as being adhered to only a battery case. To the contrary, in the present exemplary embodiment, the insulating film 10 is adhered to both the battery case 30 and the separator 70.

Regarding an adhesion strength, i.e., peeling strength, a 90 degree peeling strength A of an adhesion portion between the insulating film 10 and the battery case 30 is greater than a 90 degree peeling strength B of an adhesion portion between the insulating film 10 and the separator 70. For example, the 90 degree peeling strength A may be 15 mN/cm or greater, and the 90 degree peeling strength B may be 5 mN/cm or greater. As will be described in more detailed below, by satisfying the above-described adhesion strength relationship between the peeling strength A and the peeling strength B, breakage of the insulating film 10 may be prevented even when a temperature change between a high temperature and a low temperature is repeated.

Figure 4A:
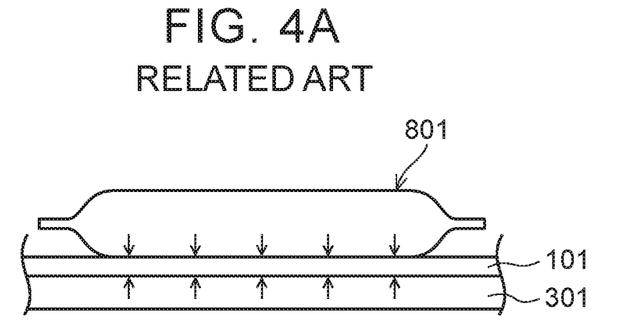
FIG. 4A is a schematic view showing a state of an insulating film before being exposed to a high temperature.
Figure 4B:
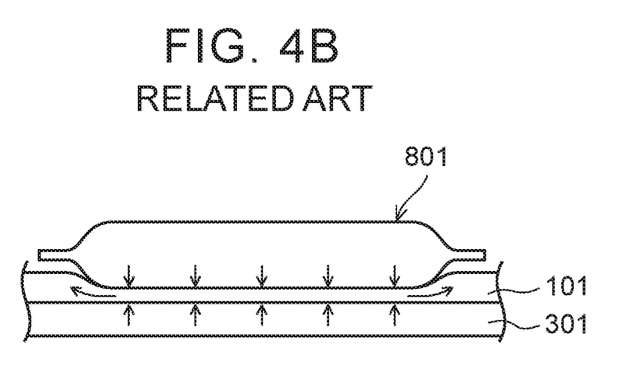
FIG. 4B is a schematic view showing a state of the insulating film of FIG. 4A after being exposed to a high temperature.
Figure 4C:
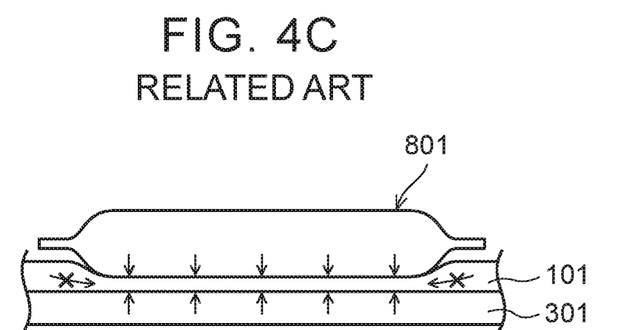
FIG. 4C is a schematic view showing a state of the insulating film of FIG. 4A after being exposed to a low temperature subsequent to the state of FIG. 4B.

FIGS. 4A to 4C are diagrams showing the mechanism for the breakage of the insulating film. FIGS. 4A-4C show only a part of the electrode body, the insulating film, and the battery case (wide side) in a section of the secondary battery parallel to the lid and the case bottom. As shown in FIG. 4A, an insulating film 101 is tightly held in contact with a battery case 301 and an electrode body 801 while receiving pressure from the battery case 301 and the electrode body 801. In some secondary batteries, a thermal expansion coefficient of the battery case 301 may be lower than respective thermal expansion coefficients of the insulating film 101 and a separator of the electrode body 801. Accordingly, when the secondary battery experiences a high temperature (for example, 60° C. or higher), the insulating film 101 may be more likely to expand than the battery case 301 because the insulating film 101 may have a higher thermal expansion coefficient than the battery case 301. As a result, portions of the insulating film 101 may expand away from those portions of the insulating film 101 which are held in contact with the battery case 301 and the electrode body 801. Thus, as shown in FIG. 4B, a thickness of those portions of the insulating film 101 that are held in contact with the battery case 301 and the electrode body 801 may decrease, and a thickness of those portions of the insulating film 101 that are not held in contact with the battery case 301 and the electrode body 801 may increase. Then, if the secondary battery experiences a low temperature (for example, −30° C. or lower), the insulating film 101 may tend to shrink. However, as shown in FIG. 4C, because portions of the insulating film 101 continue to be held in contact with the battery case 301 and the electrode body 801, the thickened portions of the insulating film 101 may not be able to return to those portions of the insulating film 101 which are held in contact with the battery case 301 and the electrode body 801. It should therefore be appreciated that due to a temperature change from a high temperature to a low temperature, the thickness of those portions of the insulating film 101 that are held in contact with the battery case 301 and the electrode body 801 may decrease, and the thickness of those portions of the insulating film 101 that are not held in contact with the battery case 301 and the electrode body 801 may increase. When a temperature change from a high temperature to a low temperature is repeated, the above-described increase and decrease in thickness may slowly progress. When the thickness of those portions of the insulating film 101 that are held in contact with the battery case 301 and the electrode body 801 is excessively decreased, the insulating film 101 may break.

To the contrary, in the present exemplary embodiment, the insulating film 10 is adhered to both the battery case 30 and the separator 70. When the lithium ion secondary battery 100 experiences a high temperature (for example, 60° C. or higher), portions of the insulating film 10 may tend to expand away from those portions of the insulating film 10 which are held in contact with the battery case 30 and the electrode body 80. However, because the insulating film 10 is adhered to both the battery case 30 and the separator 70, the insulating film 10 cannot expand away from those portions of the insulating film 10 which are held in contact with the battery case 30 and the electrode body 80. As a result, the thickness of those portions of the insulating film 10 which are held in contact with the battery case 30 and the electrode body 80 can be prevented from decreasing due to a temperature change from a high temperature to a low temperature. Accordingly, even when a temperature change from a high temperature to a low temperature is repeated, the thickness of those portions of the insulating film 10 which are held in contact with the battery case 30 and the electrode body 80 may be maintained at a sufficiently thickness. As a result, breakage of the insulating film 10 may be prevented.

As discussed above, in the present exemplary embodiment, the 90 degree peeling strength A of the adhesion portion between the insulating film 10 and the battery case 30 may be higher than the 90 degree peeling strength B of the adhesion portion between the insulating film 10 and the separator 70. Further, the thermal expansion coefficient of the battery case 30 may be lower than that of the separator 70. As a result, when the 90 degree peeling strength A is lower than the 90 degree peeling strength B, the insulating film 10 may be broken. As will be described in more detail below, in some exemplary embodiments, to prevent breakage of the insulating film 10, the 90 degree peeling strength A may be 15 mN/cm or greater, and the 90 degree peeling strength B may be 5 mN/cm or greater.

The insulating film 10 is likely to be broken when a dimension of those portions of the insulating film 10 which are held in contact with the battery case 30 and the electrode body 80 is large (for example, when a length in the width direction of a portion of the electrode body 80 in contact with the insulating film 10 is 100 mm or longer). As described above, however, the lithium ion secondary battery 100 may be configured to have a size suitable for use within a vehicle. As a result, a length in the width direction of a portion of the electrode body 80 in contact with the insulating film 10 may be 100 mm or longer.

To adjust the 90 degree peeling strength A to be 15 mN/cm or greater, a method of hydrophilizing at least one surface of the insulating film 10 may be adopted. The "hydrophillic treatment" described herein generally refers to introducing a hydrophilic group such as a hydroxyl group or a carboxyl group onto a surface of a material. Due to the hydrophillic treatment, the amount of hydrophilic groups on a surface of the insulating film 10 may be greater than that on other surfaces of the insulating film 10. Examples of hydrophillic treatments include a corona discharge treatment, a plasma treatment, and an ozone treatment. A corona discharge treatment may be used from the viewpoint of practicability.

First, the rectangular-cuboid shaped insulating film 10 having at least one hydrophilized surface is prepared. In the present exemplary embodiment, the hydrophilized surface may be a surface, i.e., an outer surface, which faces an inner surface of the battery case 30. Next, using this insulating film 10, a battery cell is constructed in which the insulating film 10 is held in contact with the battery case 30 and the electrode body 80. By performing a heat treatment on the constructed battery cell, the insulating film 10 and the battery case 30 can be adhered to on another. The heat treatment may be performed by performing a cell drying step and a high-temperature aging step during the manufacturing of the secondary battery. The cell drying step may be performed at, for example, 80° C.-115° C. The high-temperature aging step is performed at, for example, 50° C. or higher (typically 50° C. to 80° C.). The high-temperature aging step may be performed while applying restraining pressure using, for example, a restraining jig such that the insulating film 10 and the battery case 30 are adhered to one another.

By performing the cell drying step and the high-temperature aging step, the insulating film 10 and the battery case 30 are adhered to one another other, and the 90 degree peeling strength A can be adjusted to 15 mN/cm or greater. Among other examples, by changing conditions (for example, temperature conditions) of the cell drying step and the high-temperature aging step, the 90 degree peeling strength A may be adjusted. Further, by changing the material of the battery case 30, the 90 degree peeling strength A may be adjusted. As a result, by making adjustments to a common battery manufacturing step, a greater 90 degree peeling strength A may be obtained. For example, a 90 degree peeling strength A of 25 mN/cm-50 mN/cm may be obtained. Further, by not requiring additional manufacturing steps to adjust the 90 degree peeling strength A, production efficiency of the lithium ion secondary battery 100 may be maintained or improved.

Using the above-described method, the 90 degree peeling strength A may be adjusted to 15 mN/cm or higher. As discussed above, in the lithium ion secondary battery 100 according to the present exemplary embodiment, at least one surface of the insulating film 10 is hydrophilized, and the hydrophilized surface faces the inner surface of the battery case 30. The hydrophilized surface of the insulating film 10 may adhered to the inner surface of the battery case 30.

Examples of other methods for adjusting the 90 degree peeling strength A to 15 mN/cm or higher include a method of applying an adhesive having an appropriate adhesion strength to at least a contact portion between the insulating film 10 and the battery case 30 to adhere the insulating film 10 and the battery case 30 to one another. In addition to or in lieu of the adhesive, a double-sided adhesive tape may be used.

In a method for adjusting the 90 degree peeling strength B to be 5 mN/cm or higher, a blocking phenomenon between films, that is, a phenomenon in which films overlapping each other are adhered to each other may be used. In the present exemplary embodiment, the separator 70 may be formed of a polyolefin porous film, and the insulating film 10 may also be formed of polyolefin. In addition, a surface modification treatment (for example, a corona discharge treatment) may be performed on the separator 70. During the manufacturing of the secondary battery, the separator 70 and the insulating film 10 are adhered to one another, and the cell drying step and the high-temperature aging step are performed. As a result, a 90 degree peeling strength of 5 mN/cm or higher may be obtained. Among other examples, by changing conditions (for example, temperature conditions) of the cell drying step and the high-temperature aging step, the 90 degree peeling strength B may be adjusted. As a result, by making adjustments to a common battery manufacturing step, a greater 90 degree peeling strength B may be obtained. For example, a 90 degree peeling strength B of 5 mN/cm-30 mN/cm may be obtained. Further, by not requiring additional manufacturing steps to adjust the 90 degree peeling strength B, production efficiency of the lithium ion secondary battery 100 may be maintained or improved.

Examples of other methods for adjusting the 90 degree peeling strength B to 5 mN/cm or higher include a method of applying an adhesive having an appropriate adhesion strength to at least a contact portion between the insulating film 10 and the separator 70 to adhere the insulating film 10 and the separator 70 to one another. In addition to or in lieu of the adhesive, a double-sided adhesive tape may be used.

In some exemplary embodiments, to obtain an appropriate 90 degree peeling strength A and an appropriate 90 degree peeling strength B, it may be advantageous to use the following combination of materials: the battery case 30 may comprise aluminum or an aluminum alloy, the separators 70, 72 may comprise polyolefin, and the insulating film 10 may comprise polyolefin.

From the description above, it should be appreciated that the lithium ion secondary battery 100 according to the present exemplary embodiment may be manufactured using a method including: a step of preparing the electrode body 80, the battery case 30, and the insulating film 10 having the hydrophilized inner surface or outer surface; a step of constructing a battery cell in which the insulating film 10 and the electrode body 80 are accommodated in the battery case 30 such that the insulating film 10 is held in contact with the battery case 30 and the electrode body 80 and such that the surface of the insulating film 10, on which the above-described treatment is performed, faces the inner surface of the battery case 30; and a step (for example, the cell drying step and/or the high-temperature aging step) of heating the battery case 30 while pressing the battery case 30 such that the electrode body 80 and the insulating film 10 are adhered to one another and such that the insulating film 10 and the battery case 30 are adhered to one another The lithium ion secondary battery 100 may be used in various applications. For example, the lithium ion secondary battery 100 may be used as a power source in vehicles such as an electric vehicle (EV), a hybrid vehicle (HV), and a plug-in hybrid vehicle (PHV). The lithium ion secondary battery 100 may be used in the form of a battery pack in which a plurality lithium ion secondary batteries 100 are connected to each other in series and/or in parallel.

Hereinafter, several examples relating to the present disclosure will be described. It should be appreciated, however, that the following examples are not intended to limit the scope of the present disclosure.

[Preparation of Secondary Battery]

$LiNi_{1/3}Co_{1/3}Mn_{1/3}O_2$ powder as a positive electrode active material; acetylene black as a conductive material; and PVDF as a binder were kneaded with each other in N-methyl-2-pyrrolidone at 93/4/3 (mass ratio). As a result, a slurry for forming a positive electrode active material layer was prepared. This slurry was applied to both surfaces of an aluminum foil (positive electrode current collector) and was dried. Next, by pressing the aluminum foil, a positive electrode including a positive electrode active material layer formed on a positive electrode current collector was prepared. Then, graphite as a negative electrode active material; SBR as a binder; and CMC as a thickener were kneaded with each other in ion exchange water at 98/1/1 (mass ratio). As a result, a slurry for forming a negative electrode active material layer was prepared. This slurry was applied to both surfaces of a copper foil (negative electrode current collector) and was dried. Next, by roll-pressing the copper foil, a negative electrode including a negative electrode active material layer formed on a negative electrode current collector was prepared. Two separators having a three-layer structure of PP/PE/PP were prepared. A corona discharge treatment was performed on the separators.

A laminate in which the positive electrode, the separator, the negative electrode, and the separator were laminated in this order was wound to prepare an electrode body. During winding, one of the separators was positioned on the outermost surface of the electrode body. A rectangular-cuboid shaped insulating film was prepared using a polypropylene film (thickness: 50 μm) having a single surface on which a corona discharge treatment was performed or using a polypropylene film (thickness: 50 μm) on which a corona discharge treatment was not performed. As a nonaqueous electrolytic solution, a solution was used in which $LiPF_6$ as a supporting electrolyte was dissolved in a mixed solvent at a concentration of 1.1 mol/L, the mixed solvent containing EC, DMC, and EMC at a volume ratio (EC:DMC:EMC) of 30/40/30.

Lead terminals were welded to the positive and negative electrodes of the electrode body. Next, the positive and negative electrodes were accommodated in the rectangular-cuboid shaped insulating film, and not only the electrode body but also the insulating film were accommodated in a battery case formed of aluminum (A3003). As a result, a battery cell was obtained. Cell drying was performed on the battery cell. Next, a nonaqueous electrolytic solution was injected into the battery cell, and initial charging and high-temperature aging were performed thereon. In this way, Battery Nos. 1-15 were prepared. In order to change the 90 degree peeling strength A and the 90 degree peeling strength B, in Battery Nos. 1-10, the surface of the polypropylene film on which the corona discharge treatment was performed was adjusted to be an outer surface (a surface to be in contact with an inner surface of the battery case); and in Battery Nos. 11-14, the surface of the polypropylene film on which the corona discharge treatment was performed was adjusted to be an inner surface (a surface to be in contact with the separator of the electrode body). In Battery No. 15, the polypropylene film on which the corona discharge treatment was not performed was used. In addition, in order to change the 90 degree peeling strength A and the 90 degree peeling strength B, cell drying conditions and high-temperature aging conditions were changed for each battery.

[Evaluation of Peeling Strength]

For convenience, regarding a sample exposed to the same conditions as manufacturing conditions of each of Battery Nos. 1-15, the peeling strength was measured.

(1) 90 Degree Peeling Strength A

The polypropylene film used to prepare the rectangular-cuboid shaped insulating film of each of Battery Nos. 1-15 was cut into a strip shape having a size of 10 mm×150 mm. This polypropylene film was adhered to a sheet formed of aluminum (A3003) (the same material as the battery case). At this time, when the corona discharge treatment was performed on the polypropylene film, the direction of the surface on which the corona discharge treatment was performed was adjusted as shown in the manufacturing conditions of each of Battery Nos. 1-14. Next, the sample was exposed to the same conditions as it would experience during cell drying and high-temperature aging during the manufacturing of each of Battery Nos. 1-15. Regarding each of the samples obtained as described above, the 90 degree peeling strength was measured using a tensile testing machine ("SV-201NA-50SL" manufactured by Imada Seisakusho Co., Ltd.). Specifically, the sample was fixed to a horizontally movable table through a double-sided adhesive tape, and the polypropylene film was vertically pulled and peeled off at a rate of 20 mm/min while moving the table. At this time, the load was measured.

(2) 90 Degree Peeling Strength B

The polypropylene film used to prepare the rectangular-cuboid shaped insulating film of each of Battery Nos. 1-15 was cut into a strip shape having a size of 10 mm×150 mm.

The polypropylene film was adhered to the separator used for the manufacturing of the battery. At this time, when the corona discharge treatment was performed on the polypropylene film, the direction of the surface on which the corona discharge treatment was performed was adjusted as shown in the manufacturing conditions of each of Battery Nos. 1-14. Next, the sample was exposed to the same conditions as it would experience during cell drying and high-temperature aging during the manufacturing of each of Battery Nos. 1-15. Regarding each of the samples obtained as described above, as in the case of the 90 degree peeling strength A, the 90 degree peeling strength was measured using a tensile testing machine ("SV-201NA-50SL" manufactured by Imada Seisakusho Co., Ltd.).

[Evaluation for Breakage of Separator]

Using each of the obtained Battery Nos. 1-15, a thermal shock cycling test was performed. Specifically, a temperature change in which each of the batteries was heated to a temperature of 60° C. or higher and then was cooled to a temperature of −30° C. or lower was set as one cycle. Each of the batteries underwent 1000 cycles of temperature change. Next, each of the batteries was disassembled to determine whether or not the separator was broken. The evaluation results are shown in Table 1.

TABLE 1

| Battery No. | Peeling Strength A (mN/cm) | Peeling Strength B (mN/cm) | Peeling Strength A/ Peeling Strength B | Breakage of Separator |
|---|---|---|---|---|
| 1 | 43 | 9 | 4.8 | Not Broken |
| 2 | 44 | 11 | 4 | Not Broken |
| 3 | 34 | 9 | 3.8 | Not Broken |
| 4 | 34 | 11 | 3.1 | Not Broken |
| 5 | 32 | 12 | 2.7 | Not Broken |
| 6 | 34 | 16 | 2.1 | Not Broken |
| 7 | 32 | 20 | 1.6 | Not Broken |
| 8 | 23 | 7 | 3.3 | Not Broken |
| 9 | 15 | 5 | 3.0 | Not Broken |
| 10 | 15 | 0 | — | Broken |
| 11 | 15 | 20 | 0.75 | Broken |
| 12 | 7 | 17 | 0.4 | Broken |
| 13 | 5 | 18 | 0.3 | Broken |
| 14 | 4 | 16 | 0.3 | Broken |
| 15 | 0 | 0 | — | Broken |

As shown in Table 1, in Battery Nos. 1-9 in which the peeling strength A was higher than the peeling strength B which was 5 mN/cm or higher, the breakage of the separator was prevented. On the other hand, in Battery No. 10 corresponding to the technique of the related art in which the insulating film and the separator were not adhered to each other, the separator was broken. In Battery Nos. 11-14 in which the peeling strength A was lower than the peeling strength B, the separator was broken. In Battery No. 15 in which the insulating film was not adhered to the battery case and the separator, the separator was broken.

Hereinabove, exemplary embodiments and examples of the present disclosure have been described in detail. However, these exemplary embodiments and examples are merely exemplary. It should be appreciated that the present disclosure includes various modifications and alternations of the above-described exemplary embodiments and examples as would be understood by one of ordinary skill in the art. For example, within a range where the effects of the present disclosure are obtained, as long as an adhesion surfaces is substantially formed, the entire surface of the adhesion surface may not have a predetermined peeling strength (a peeling strength A of 15 mN/cm or higher or a peeling strength B of 5 mN/cm or higher). That is, the peeling strength of a part of the adhesion surface may be lower than a predetermined value. For example, when the insulating film is adhered to the separator or the battery case, on the adhesion surface, a double-sided adhesive tape or an adhesive may be provided at intervals (for example, in a striped pattern, a checkered pattern, and the like).

What is claimed is:

1. A secondary battery comprising:
an electrode body including a positive electrode, a negative electrode, and a separator which is positioned on an outermost surface of the electrode body;
a battery case that accommodates the electrode body; and
an insulating film that is held in contact with the electrode body and the battery case, wherein
a thermal expansion coefficient of the battery case is lower than those of the insulating film and the separator,
portions of the insulating film, which are held in contact with the electrode body and the battery case, are adhered to the separator, which is positioned on the outermost surface of the electrode body, and the battery case, respectively,
a first 90 degree peeling strength of an adhesion portion between the insulating film and the battery case is higher than a second 90 degree peeling strength of an adhesion portion between the insulating film and the separator,
the first 90 degree peeling strength is 15 mN/cm or higher, and
the second 90 degree peeling strength is 5 mN/cm or higher.

2. The secondary battery according to claim 1, wherein
at least one surface of the insulating film is hydrophilized, and
the hydrophilized surface faces an inner wall of the battery case.

3. The secondary battery according to claim 1, wherein a thickness of the insulating film is 70 μm or less.

4. The secondary battery according to claim 1, wherein the first 90 degree peeling strength is between 25 mN/cm and 50 mN/cm, and the second 90 degree peeling strength is between 5 mN/cm and 30 mN/cm.

5. The secondary battery according to claim 1, wherein a thickness of the insulating film is 30 μm or more.

6. The secondary battery according to claim 1, wherein a thickness of the insulating film is between 45 μm and 55 μm.

7. The secondary battery according to claim 1, wherein the battery case is formed of aluminum or an aluminum alloy.

8. The secondary battery according to claim 1, wherein the separator is formed of polyolefin.

9. The secondary battery according to claim 1, wherein the insulating film is formed of polyolefin.

10. A secondary battery comprising:
an electrode body;
an insulating film; and
a battery case, wherein the battery case accommodates the electrode body, wherein:
the insulating film is held in contact with the battery case and the electrode body,
an outer surface of the insulating film is adhered to an inner surface of the battery case with a first adhesion strength,
an inner surface of the insulating film is adhered to an outer surface of the electrode body with a second adhesion strength, and the first adhesion strength is greater than the second adhesion strength.

11. The secondary battery according to claim 10, wherein the first adhesion strength is a 90 degree peeling strength of 15 mN/cm or higher, and the second adhesion strength is a 90 degree peeling strength of 5 mN/cm or higher.

12. The secondary battery according to claim 11, wherein the first adhesion strength is a 90 degree peeling strength of between 25 mN/cm and 50 mN/cm, and the second adhesion strength is a 90 degree peeling strength of between 5 mN/cm and 30 mN/cm.

13. The secondary battery according to claim 10, wherein a ratio of the first adhesion strength to the second adhesion strength is 3:1 or greater.

14. The secondary battery according to claim 10, wherein the outer surface of the insulating film is hydrophilized.

15. A method of preparing a secondary battery, the method comprising:
    providing an electrode body, an insulating film, and a battery case;
    adhering a first surface of the insulating film to the battery case with a first adhesion strength and a second surface of the insulating film to the electrode body with a second adhesion strength; and
    adjusting at least one of the first adhesion strength and the second adhesion strength such that the first adhesion strength is greater than the second adhesion strength.

16. The method of preparing a secondary battery according to claim 15, wherein
    adhering the first surface of the insulating film to the battery case with the first adhesion strength and the second surface of the insulating film to the electrode body with the second adhesion strength comprises performing a heat treatment.

17. The method of preparing a secondary battery according to claim 16, wherein
    the step of adjusting at least one of the first adhesion strength and the second adhesion strength comprises changing conditions under which the heat treatment is performed.

18. The method of preparing a secondary battery according to claim 15, wherein
    the step of adjusting at least one of the first adhesion strength and the second adhesion strength comprises performing a hydrophillic treatment.

* * * * *